(12) United States Patent
Kuno et al.

(10) Patent No.: US 7,475,589 B2
(45) Date of Patent: Jan. 13, 2009

(54) KNOCK SENSOR

(75) Inventors: Hiroyuki Kuno, Aichi (JP); Katsuki Aoi, Gifu (JP); Noriaki Kondo, Aichi (JP)

(73) Assignee: NGK Spark Plug Co., Ltd. (JP)

( * ) Notice: Subject to any disclaimer, the term of this patent is extended or adjusted under 35 U.S.C. 154(b) by 257 days.

(21) Appl. No.: 11/359,894

(22) Filed: Feb. 21, 2006

(65) Prior Publication Data
US 2006/0207312 A1 Sep. 21, 2006

(30) Foreign Application Priority Data
Feb. 25, 2005 (JP) ............... 2005-050754
Dec. 14, 2005 (JP) ............... 2005-360571

(51) Int. Cl.
*G01L 23/22* (2006.01)
(52) U.S. Cl. .................................... 73/35.11
(58) Field of Classification Search ................. 73/35.11
See application file for complete search history.

(56) References Cited

U.S. PATENT DOCUMENTS

| 4,483,181 A | * | 11/1984 | Maekawa et al. | ......... 73/35.13 |
|---|---|---|---|---|
| 4,491,010 A | * | 1/1985 | Brandt et al. | .............. 73/35.05 |
| 6,752,005 B2 | | 6/2004 | Harada et al. | .............. 73/35.13 |
| 6,986,277 B2 | | 1/2006 | Yokoi | ........................ 73/35.11 |
| 2005/0086999 A1 | * | 4/2005 | Subramanian et al. | ...... 73/35.11 |

FOREIGN PATENT DOCUMENTS

JP 2004-85255 3/2004

\* cited by examiner

Primary Examiner—Robert R Raevis
(74) Attorney, Agent, or Firm—Kusner & Jaffe

(57) ABSTRACT

A knock sensor 1 for attachment to an internal combustion engine. The knock sensor 1 includes a cap 41*a* and a support member 11. At least a part of the top surface of the support member 11 is covered by cap 41*a* to prevent a mounting bolt 91 from directly making contact with the top surface of the support member 11 when the mounting bolt 91 extends through a through-hole 71 in the sensor. The cap 41*a* covers the top surface of the support member 11 to protect the support member from being ground or abraded by the mounting bolt 91.

11 Claims, 6 Drawing Sheets

KNOCK SENSOR

FIELD OF THE INVENTION

This invention relates to a knock sensor for detecting knocks caused in an internal combustion engine.

BACKGROUND OF THE INVENTION

A knock sensor is a device for detecting knocks caused in an internal combustion engine. Conventionally, a knock sensor is fixed to a mounting portion of an internal combustion engine by means of a fixing member, such as a bolt, which extends through a through-hole formed in a support member that supports a piezoelectric element (i.e. a sensor element).

Japanese Patent Application Laid-open (kokai) No. 2004-85255 discloses a knock sensor having a support member made of a material, such as resin, having a relatively small Young's modulus to improve an output from the knock sensor.

A problem with this type of knock sensor is that the sensor is connected to an internal combustion engine with a top surface of a support member in contact with a fixing material (bolt), whereby the top surface of the support member is ground, i.e., abraded, by the fixing member (bolt) when connected to the internal combustion engine. As a result, the sensor performance of the knock sensor tended to vary. Specifically, when the support member was made of a soft material having a small Young's modulus, such as resin, the support member is more likely to be ground or abraded by the fixing member.

The present invention addresses the above-mentioned problem. An advantage of the invention is a knock sensor that is fixed to an internal combustion engine by means of extending the fixing member through a through-hole formed in the support member, and which is capable of protecting the support member from being ground by the fixing member.

SUMMARY OF THE INVENTION

First embodiment of the present invention accomplishing the above-described purpose is a knock sensor comprising: a support member having a through-hole; a piezoelectric element held by the support member, wherein a fixing member extends through the through-hole and tightens the knock sensor from the upper face of the support member, while the bottom surface of the support member makes contact with an internal combustion engine; and a covering member fixed in a non-rotating state to the support member so that at least a part of the top surface of the support member may be covered, wherein the covering member is capable of preventing the fixing member from directly making contact with the top surface of the support member when the fixing member extends through the through-hole.

Therefore, such a knock sensor may protect the top surface of the support member from being ground or abraded by the fixing member, because the covering member covers the top surface of the support member. Further, since the covering member is fixed in a non-rotating state to the support member, the covering member is prevented from sliding on the support member when the fixing member is tightened. Thus, the support member is also protected from being abraded by the covering member.

In addition, the fixing member may be formed from two individual members: a member which extends through the through-hole; and a member which tightens up the knock sensor from the top surface of the support member, or by a combined member thereof. It is also contemplated that the knock sensor may include the covering member fixed to the support member.

The covering member of such a knock sensor is fixed to the support member so as not to come off therefrom when the knock sensor is fixed to a mounting portion of the internal combustion engine. As a result, the mounting workability of the knock sensor will be improved.

Further, the knock sensor preferably has a covering member that covers the entire top surface of the support member. Such a knock sensor would prevent the fixing member from directly making contact with the top surface of the support member. Furthermore, the support member may make even contact with the covering member which leads to a successful mounting of the knock sensor to the internal combustion engine.

Moreover, in the knock sensor, the covering member comprises: a cylindrical portion in the shape of a hollow post defined by the through-hole; and a flange portion outwardly projecting from an upper side of the cylindrical portion and preferably provided so as to cover the top surface of the support member.

The flange portion of such a knock sensor, which covers the top surface of the support member, may be easily positioned using the cylindrical portion. In addition, adapting a structure where the cylindrical portion is press-fitted into the through-hole of the support member, the fixation of the covering member and the support member may be easily realized.

Moreover, in the knock sensor, the covering member preferably has a larger Young's modulus than that of the support member.

The covering member of such a knock sensor is unlikely to be ground, thereby further preventing the top surface of the support member from being ground by the fixing member.

Furthermore, in the knock sensor, the covering member is preferably made of metal.

The covering member of such a knock sensor may be easily obtained, as well as readily processed.

Moreover, in the knock sensor, the support member may preferably be made of metal, more preferably be made of resin.

In such a knock sensor, generally the weight of resin is lighter than that of metal, allowing the weight of the knock sensor to be reduced.

Also, the Young's modulus of resin is generally smaller than that of metal. Making the support member from resin increases the extent of expansion of the support member at the time of vibration. For this reason, a load that a weighting member imposes on the piezoelectric element may be increased. As a result, the output from the knock sensor can be extended.

Moreover, when a knock sensor having a support member made of a material that is easily ground, adopts the configuration described in the first embodiment of the present invention, the support member is unlikely to be ground.

Further, in the knock sensor, the covering member may comprise a plurality of holes formed in a portion which covers the top surface of the support member, and the support member may include projecting portions formed in the top surface thereof so as to engage with the holes of the covering member.

In such a knock sensor, the protruding portions of the support member engage with the holes of the covering member to thereby prevent the covering member from sliding on the top surface of the support member.

BRIEF DESCRIPTION OF THE DRAWINGS

FIG. 3A is a top view of a cap 41a;

FIG. 3B is an elevational view of a cap 41a;

FIG. 3C is a side view of a cap 41a;

DETAILED DESCRIPTION OF PREFERRED EMBODIMENT

An embodiment of the present invention will be described below with reference to the drawings.

Figure 1:
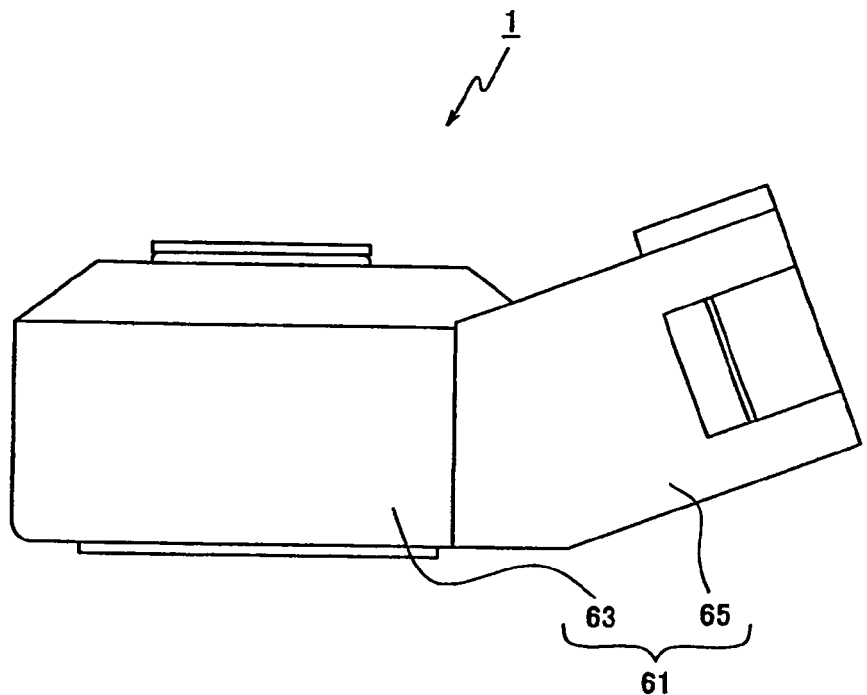
FIG. 1 is an elevational view of a non-resonance type knock sensor 1.

Referring first to FIG. 1, a non-resonance type knock sensor 1 according to the present invention (hereinafter referred to simply as knock sensor 1) is shown. FIG. 1 is an elevational view of a non-resonance type knock sensor 1.

A non-resonance type knock sensor 1 according to the present invention includes a casing 61 made of an insulation material (various types of resin material, such as PA (polyamide), which accommodates components, such as a piezoelectric element 23, therein.

The casing 61 includes a cylindrically shaped housing portion 63 whose upper side (the topside in FIG. 1, hereinafter called the upper side) is tapered and a connector portion 65 connected to an external device (e.g. ignition timing control unit). The connector portion 65 projects outwardly from an outer wall of the housing portion 63.

Figure 2:
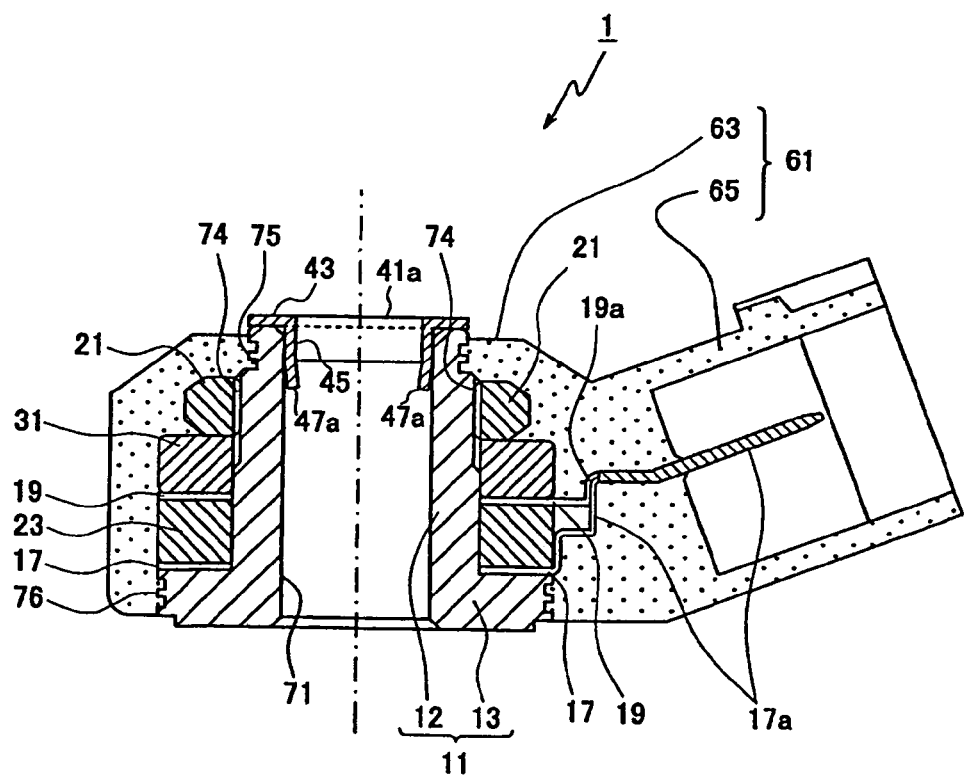
FIG. 2 is a sectional view showing an internal structure of the knock sensor 1.

Referring now to FIG. 2, an internal structure of the knock sensor 1 is shown. FIG. 2 is a sectional view showing the internal structure of the knock sensor 1.

As shown in FIG. 2, the knock sensor 1 comprises a support member 11, a lower side electrode member 17, the piezoelectric element 23, an upper side electrode member 19, a weighting member 31, a nut 21, a cap 41a (a covering member in the present invention) and the casing 61.

The support member 11 is, for example, made of an insulating material such as resin (Nylon MXD6: Vickers hardness Hv=42, Young's modulus E=20.4 [GPa]) and comprises a cylindrically-shaped main body portion 12 that extends in an axial direction and a flange portion 13 projecting radially outwardly from a lower side portion of the main body portion 12 in an axial direction. In one embodiment, the flange portion 13 has a diameter of 23 mm.

A through-hole 71 extends through main body portion 12 in an axial direction. A distal portion of an outer circumference face of the main body portion 12 and an outer circumference face of the flange portion 13 have an annular locking thread 75, 76, respectively, so as to enhance adhesion between the main body portion 12 and the casing 61. In the outer circumference face of the main body portion 12, an external thread(s) 74 accommodating a nut 21 is provided at a lower side (the downside in FIG. 1, hereinafter called the lower side) of the annular locking thread 75.

The piezoelectric element 23 is made of a material (e.g. various types of ceramics, such as lead zirconate titanate (PZT) and barium titanate, various crystal, such as crystalline quartz, or various types of organic materials, such as polyvinylidene fluoride) having a piezoelectric effect. Piezoelectric element 23 is formed in an annular shape so as to surround the circumference of the main body portion 12. Piezoelectric element 23 is disposed on the upper surface of the flange portion 13. Further, the piezoelectric element 23 has electrodes 17, 19 disposed on both top and bottom surface thereof, respectively.

Figure 4:
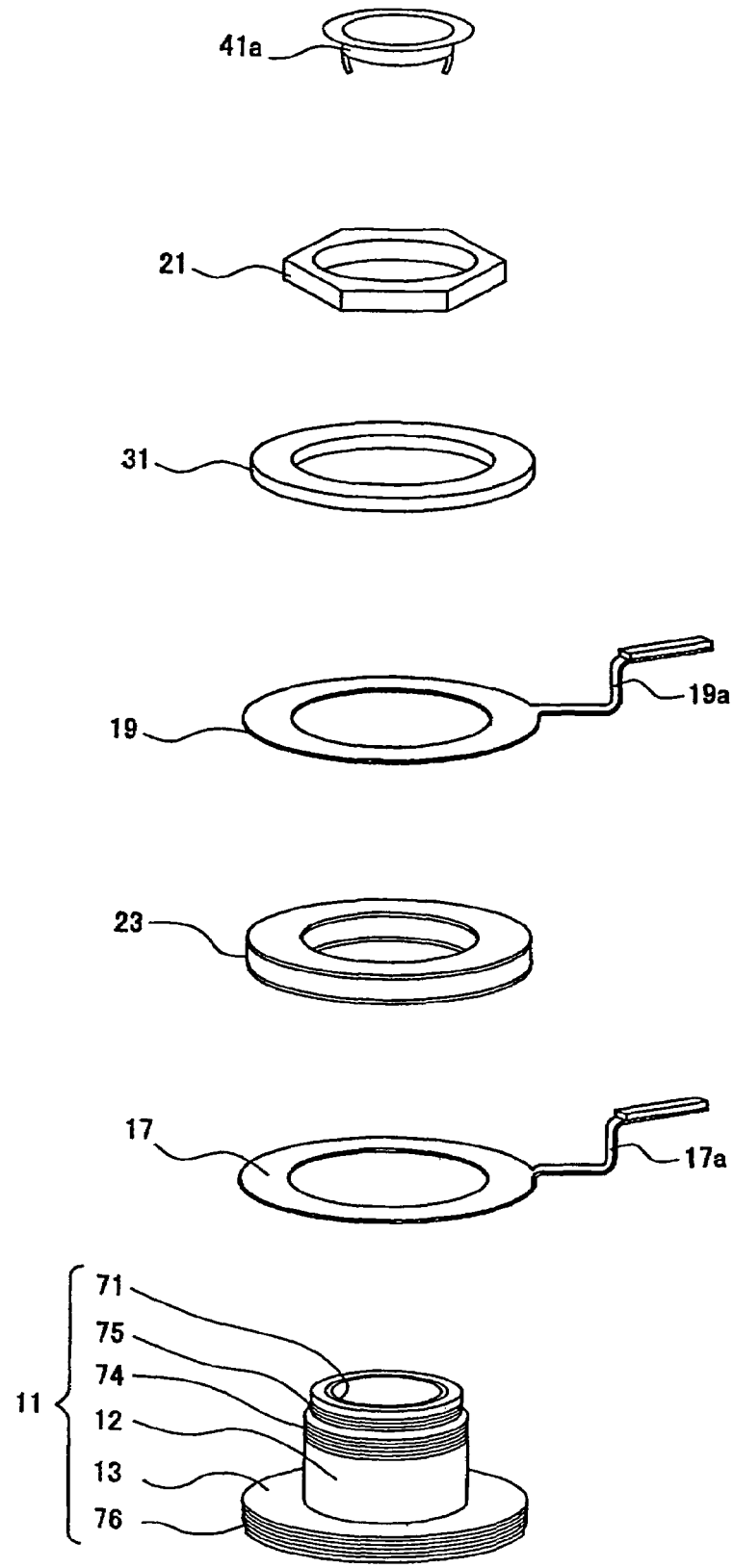
FIG. 4 is an exploded perspective view showing a part of components provided in the knock sensor 1.

The lower side electrode member 17, best seen in FIG. 4, has an annular form so as to surround the circumference of the main body portion 12. Electrode member 17 contacts the bottom surface of the piezoelectric element 23. The lower side electrode member 17 has a terminal portion 17a extending from the bottom surface of the piezoelectric element 23 to the connector portion 65. The terminal portion 17a is used as an electric path for an electric signal output from the bottom surface of the piezoelectric element 23.

The upper side electrode member 19 has an annular form so as to surround the circumference of the main body portion 12. Electrode member 19 contacts the top surface of the piezoelectric element 23. The upper side electrode member 19 has a terminal portion 19a extending from the top surface of the piezoelectric element 23 to the connector portion 65. The terminal portion 19a is used as an electric path for an electric signal output from the top surface of the piezoelectric element 23.

A weighting member 31 is comprised of an annular-shaped metal material (various types of metal materials, such as brass) and is disposed on the upper side of the upper side electrode member 19 so as to surround the circumference of the main body portion 12, thereby imposing a load on the piezoelectric element 23.

The nut 21 is made of annular-shaped metal material and has internal threads (not shown) formed in an inner circumferential surface thereof. Nut 21 is dimensioned such that the internal threads thereon engage with the external threads 74 of the main body portion 12 so as to fix nut 21 with the main body portion 12. Notably, the outer circumferential shape of the nut 21, which is perpendicular to the axial direction, assumes a form of a polygon (e.g. hexagon) so that the nut 21 may be tightened and fixed to the main body portion 12 by a tool or the like.

Figure 3A:
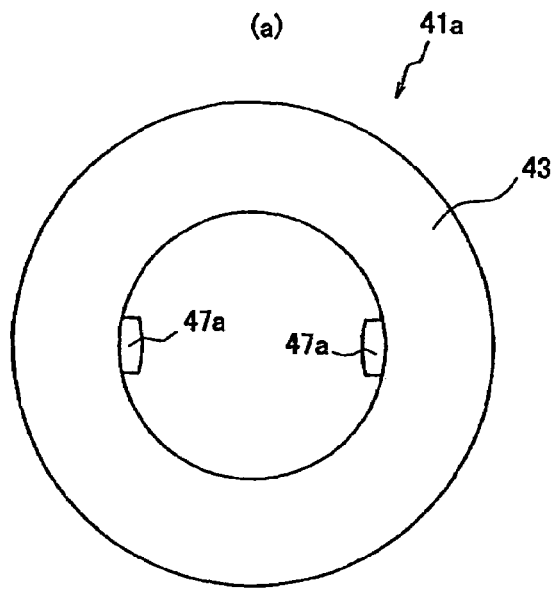
Figure 3B:
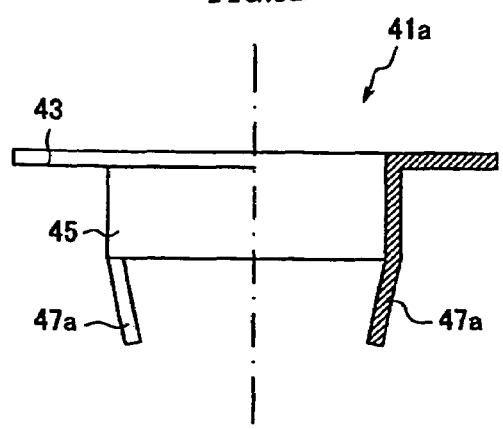
Figure 3C:
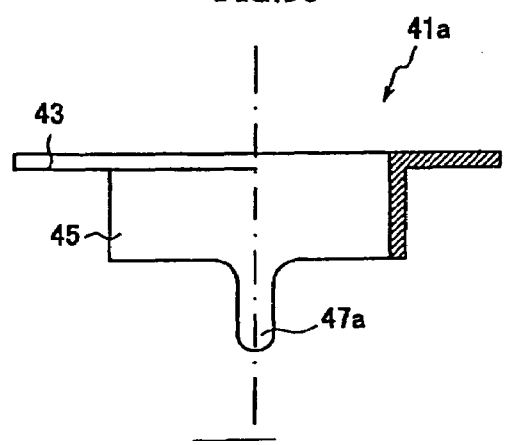

The cap 41a, best seen in FIGS. 3A-3C, is made of a metal material. By way of example and not limitation, cap 41a is formed of SUS 304 stainless steel (Vickers hardness Hv=140-190, Young's modulus E=197 [GPa]). Cap 41a includes a cylindrical portion 45 that has a cylindrical shape, and a flange portion 43 that projects radially outwardly from an end of the cylindrical portion 45. Notably, the cylindrical portion 45 and the flange portion 43 are formed as an integrated unit.

The cylindrical portion 45 of the cap 41a has an outer diameter that is slightly larger (about 0.05-0.2 mm) than an inner diameter of the through-hole 71 of the support member 11. The outer diameter of the flange portion 43 generally coincides with the outer diameter of the top surface of the support member 11.

As thus configured, the cylindrical portion 45 of cap 41a is fitted (press-fitted) into the through-hole 71 from the upper side of the knock sensor 1. Cap 41a is positioned within support member 11 such that the flange portion 43 of cap 41a makes contact with the top surface of the support member 11. That is, the cap 41a is fixed so as not to rotate around the support member 11.

Referring to FIG. 3A, FIG. 3B and FIG. 3C, the cap 41a shall now be described in detail. FIG. 3A is a top view of a cap 41a, FIG. 3B is an elevational view (partial cross section) of a cap 41a and FIG. 3C is a side view (partial cross section) of a cap 41a.

As shown in FIG. 3A, the cap 41a includes the cylindrical portion 45 and the flange portion 43. Cap 41a also includes projections 47a.

The projections 47a, as shown in FIG. 3A and FIG. 3B, are formed at two (2) locations in the end (lower side) of the cylindrical portion 45 where the flange 43 is not formed. Each projection 47a is located opposed to each other against the central axis of the cylindrical portion 45. Each projection 47a is slightly inclined (about 5 degrees) at a joint portion (a root portion of the projection 47a) in a direction toward the central axis of the cylindrical portion 45.

Referring now to FIG. 4, an assembly of the knock sensor 1 will be described. FIG. 4 is an exploded perspective view showing several of the components that form knock sensor 1.

As shown in FIG. 4, in the assembly process of the knock sensor 1, the lower side electrode member 17, the piezoelectric element 23, the upper side electrode member 19 and the weighting member 31 are stacked in the order of mention from the lower side to the upper side so as to surround the outer circumference of the main body portion 12 of the support member 11.

Nut 21 is then screwed onto threads 74 of the support member 11 so that the lower side electrode member 17, the piezoelectric element 23, the upper side electrode member 19 and the weighting member 31 are clamped and fixed between the flange portion 13 of the support member 11 and the nut 21.

An injection mold is then positioned so as to surround these components, and an insulation material is injection molded to cover these components, thereby forming a casing 61.

Finally, the cylindrical portion 45 of the cap 41a is inserted into the through-hole 71 from the upper side of the knock sensor 1.

The non-resonance type knock sensor 1 is thus assembled.

As best seen in FIG. 2, the knock sensor 1 is formed such that the bottom end of the flange 13 of the support member 11 is exposed at the lower side of the casing 61, and the top end of the main body portion 12 of the support member 11 and the flange portion 43 of the cap 41a are exposed at the upper side of the casing 61. Further, a terminal portion 17a of the lower side electrode member 17 and a terminal 19a of the upper side electrode member 19 are each formed so that a part thereof is extended inside of the connector 65.

Thus-assembled, non-resonance type knock sensor 1 is attached to an internal combustion engine. A knock sensor 1 will be mounted on an internal combustion engine in such a manner that the bottom surface of the knock sensor (i.e. the bottom surface of the flange 13 of the support member 11) may contact an appropriate location (generally a mounting portion of a cylinder block) of the internal combustion engine.

Figure 5:
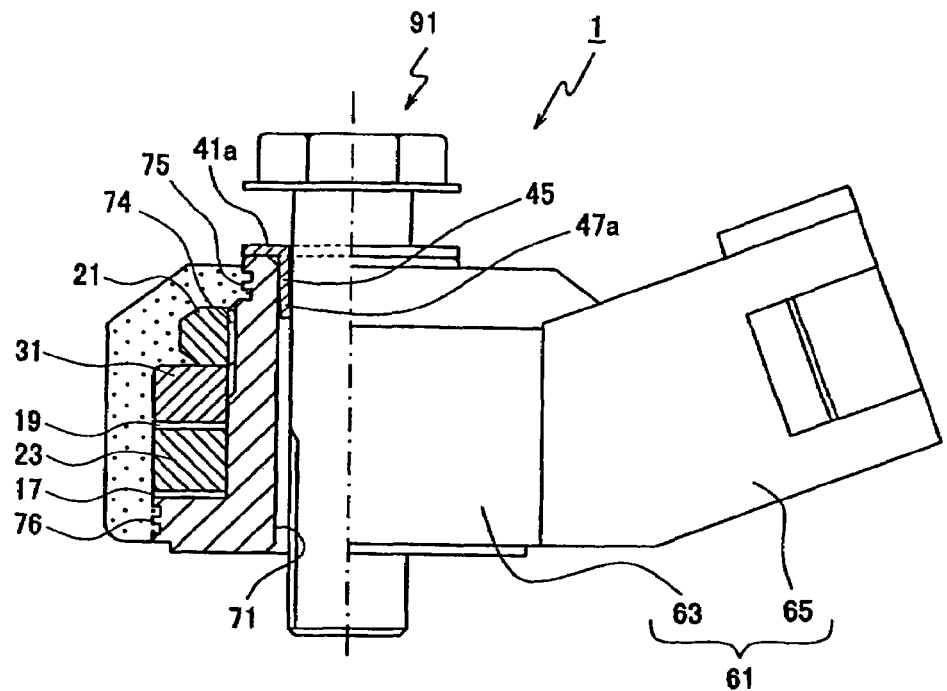
FIG. 5 is a partial sectional view showing a state that a mounting bolt 91 is inserted into the knock sensor 1.

Referring now to FIG. 5, a method of mounting knock sensor 1 shall be described. A mounting bolt 91 (a fixing member in the present invention) having an outer diameter slightly smaller than an inner diameter of the cylindrical portion 45 of the cap 41a is inserted into and through the through-hole 71 of the support member 11 from the upper face of the support member 11. The mounting bolt 91 is then screwed into internal threads formed in the internal combustion engine to thereby secure the bolt, and knock sensor 1, to the internal combustion engine.

When any abnormal vibration(s), such as knocking, occurs in the internal combustion engine, the vibration(s) reaches to the piezoelectric element 23 via the flange 13 of the support member 11. The piezoelectric element 23 accordingly outputs an electric signal to an external device through the terminal portion 17a of the lower side electrode member 17 and the terminal portion 19a of the upper side electrode member 19.

When the knock sensor 1 is delivered to the factory where the knock sensor 1 is assembled to the internal combustion engine, the knock sensor 1 may assume a unit form where the mounting bolt 91 extends through the through-hole 71 from the upper face of the support member 11, as shown in FIG. 5. In this configuration, projections 47a of the cap 41a contact and hold the mounting bolt 91 so that the mounting bolt 91 may be prevented from slipping out from the through-hole. Thus, the knock sensor 1 is delivered without the mounting bolt 91 dropping out.

The knock sensor 1 described above comprises the support member 11 having the through-hole 71 where the mounting bolt 91 extends through and the piezoelectric element 23 held by the support member 11. The knock sensor 1 is formed such that the mounting bolt 91 extends through the through-hole 71 and tightens the knock sensor from the upper face of the support member 11, while the bottom surface of the support member 11 makes contact with the internal combustion engine. Further, the knock sensor 1 comprises the cap 41a fixed to the support member 11 so that at least a part of the top surface of the support member 11 may be covered. Cap 41a prevents the mounting bolt 91 from directly making contact with the top surface of the support member 11 when the mounting bolt 91 extends through the through-hole 71.

Therefore, the knock sensor 1 may protect the top surface of the support member 11 from being ground by the mounting bolt 91, because the cap 41a covers the top surface of the support member 11.

Further, since the cap 41a is attached to the support member 11 so as not to come off therefrom when the knock sensor 1 is attached to a mounting portion of the internal combustion engine, the mounting workability of the knock sensor 1 will be improved.

As shown in the drawings, the knock sensor 1 is formed such that the cap 41a covers the entire top surface of the support member 11. Thus, direct contact between the mounting bolt 91 and the top surface of the support member 11 is avoided. Moreover, since the cap 41a is designed to make even contact with the mounting bolt 91, the knock sensor 1 can be more easily and successfully mounted onto the internal combustion engine.

Furthermore, the cap 41a includes the cylindrical portion 45 in the shape of a hollow post defined by the through-hole 71 and the flange portion 43 outwardly projecting from the upper side of the cylindrical portion 45 and provided so as to cover the top surface of the support member 11.

Therefore, in the knock sensor 1, the flange portion 43 covering the top surface of the support member 11 is easily positioned using the cylindrical portion 45. In addition, since the cylindrical portion 45 of the cap 41a is press-fitted into the through-hole 71 of the support member 11, fixation of the cap 41a and the support member 11 may be easily realized.

Also, the cap 41a is made of a metal whose Young's modulus is greater than that of the support member 11. Thus, the knock sensor 1 may further protect the top surface of the support member 11 from being ground by the mounting bolt 91. Moreover, the material of the cap 41a is easily obtained as well as easily processed.

The support member 11 is preferably made of a resin material. In the knock sensor 1, generally the weight of resin is lighter than that of metal, allowing the weight of the knock sensor 1 to be reduced. Also, Young's modulus of resin material is smaller than that of metal material. Thus, if the support member 11 is made of resin, it is possible to increase the flexibility of the support member 11 when the vibration occurs. Therefore, a weight imposed on the piezoelectric element 23 by a weighting member 31 may be increased, which leads to an increase in output of the knock sensor 1. Further, since the cap 41a covers the top surface of the support member 11, the support member 11 will not be easily ground or abraded even though it is made of soft material.

In addition, the invention is not particularly limited to the embodiments described above but may be changed or modified in various ways within the scope of the invention. For example, in the non-resonance type knock sensor 1 of the present invention, the piezoelectric element 23 and the weighting member 31 etc. are fixed to of the support member 11 using the nut 21 (fastening member) engaged with the thread formed in the support member 11. However, the piezoelectric element 23 and the weighting member 31 etc. may be directly fixed to the support member 11 using an adhesive material, instead of placing them on the flange portion 13.

Further, the support member 11 does not necessarily include a flange portion 13. For example, if no flange 13 is formed on the support member 11, the piezoelectric element 23 and the weighting member 31 etc. may be clamped on the support member 11 by a fastening member, such as the nut 21 or the like, from both ends (the upper side and lower side) of the knock sensor 1.

In the embodiment heretofore described, the support member 11 is made of an insulation resin material. However, it is also contemplated that the support member 11 may be made of, for example, a ceramic (ceramic made of silicate mineral, or made of glass, cement, various types of nonmetal, metal oxide, carbide or nitride, all of which are subjected to a heat process) or a conductive material (metal material, such as iron). However, when the support member 11 is made of conductive material, an insulation member, used for isolating one terminal of the piezoelectric element 23 from the support member 11, should be disposed between the piezoelectric element 23 and the support member 11.

Knock sensor 1 has heretofore been described as a non-resonance type knock sensor. It is also contemplated that knock sensor 1 be a resonance type knock sensor.

In the knock sensor 1 of the present embodiment, the cap 41a is press-fitted into the through-hole 71 so that the cap 41a is fixed to the inner wall face of the through-hole 71. It is also contemplated that the cap 41a may be fixed to the inner wall face of the through-hole 71 by a fixation member, such as adhesives, or by welding.

Furthermore, although the knock sensor 1 of the present embodiment is formed so as to be attached to an internal combustion engine using the mounting bolt 91, a fixing member which is formed by two individual members, such as a member extending through the through-hole 71 and a member tightening the knock sensor from the top surface of the support member 11 may be used in order to fix the knock sensor 1 to the internal combustion engine. For example, a mounting rod projecting from the internal combustion engine is inserted into the through-hole 71 of the knock sensor 1, and a fastening member, such as a nut, engages with the mounting rod thereby fixing the knock sensor 1.

Moreover, the support member 11 in the present embodiment is made of resin material. However, it is also contemplated that support member 11 may be made of metal, such as by way of example and not limitation, a cold pressed carbon steel, such as SWCH25K (Vickers hardness number Hv=240, Young's modulus E=215 [GPa]) etc.

Figure 6:
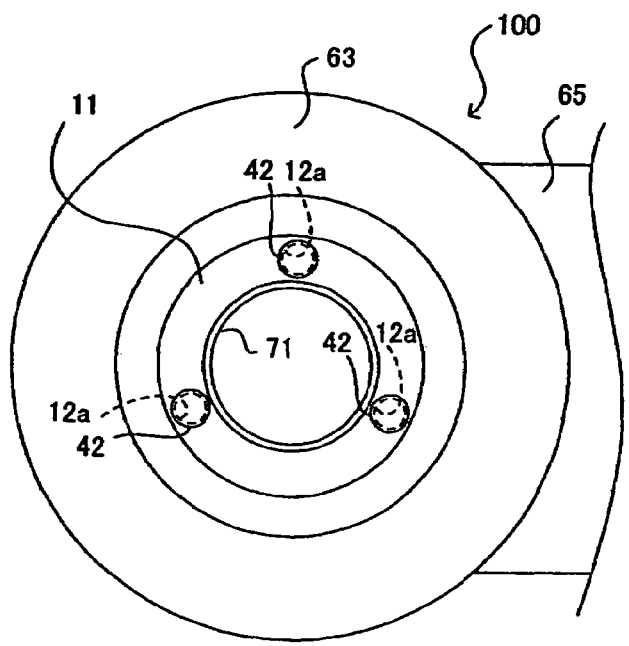
FIG. 6 is a top view of a knock sensor 100 according to a modification of the present invention.

Furthermore, a covering member of the present invention does not necessarily need to assume a form of the cap 41 as described above, but may assume a form of a plurality of screw members 42 as shown in FIG. 6. Notably, FIG. 6 is a top view of a knock sensor 100 showing a modification of the present invention.

As shown in FIG. 6, inter-fitting holes 12a are formed beforehand at the top surface of the main body portion 12 of the support member 11. Then, screw members 42 made of metal, such as a cold pressed carbon steel, such as SWCH25K (Vickers hardness number Hv=240, Young's modulus E=215 [GPa]), and having an outer diameter slightly larger (about 0.05-0.2 mm) than that of the inter-fitting hole 12a are fitted into the inter-fitting holes 12a.

The inter-fitting holes 12a formed in the knock sensor 100 are disposed evenly at three locations on the top surface of the support member 11 where each screw member 42 is fitted into.

Each screw member 42 is attached so as to project from the top surface of the support member 11, thereby preventing direct contact between the mounting bolt 91 and the support member 11. Each screw member 42 preferably projects from the top surface of the support member 11 about 2 mm.

Since the screw member 42 in the knock sensor 100 are disposed evenly at three locations (several locations) on the top surface of the support member 11, each screw member 42 may make even contact with the mounting bolt 91.

It will be appreciated by those skilled in the art that the number of inter-fitting holes 12a and screw members 42 may vary, and that more than three, equally spaced inter-fitting holes 12a and screw members 42 may be used. Further, the screw members 42, or other members, may be fixed to the support member 11 using, for example, adhesive material instead of forming the inter-fitting holes 12a.

In the embodiment heretofore described, cap 41a is press-fitted into the support member 11 so as to be fixed to the support member 11. It is also contemplated that the cap 41a is not necessarily fixed to the support member 11.

Figure 7:
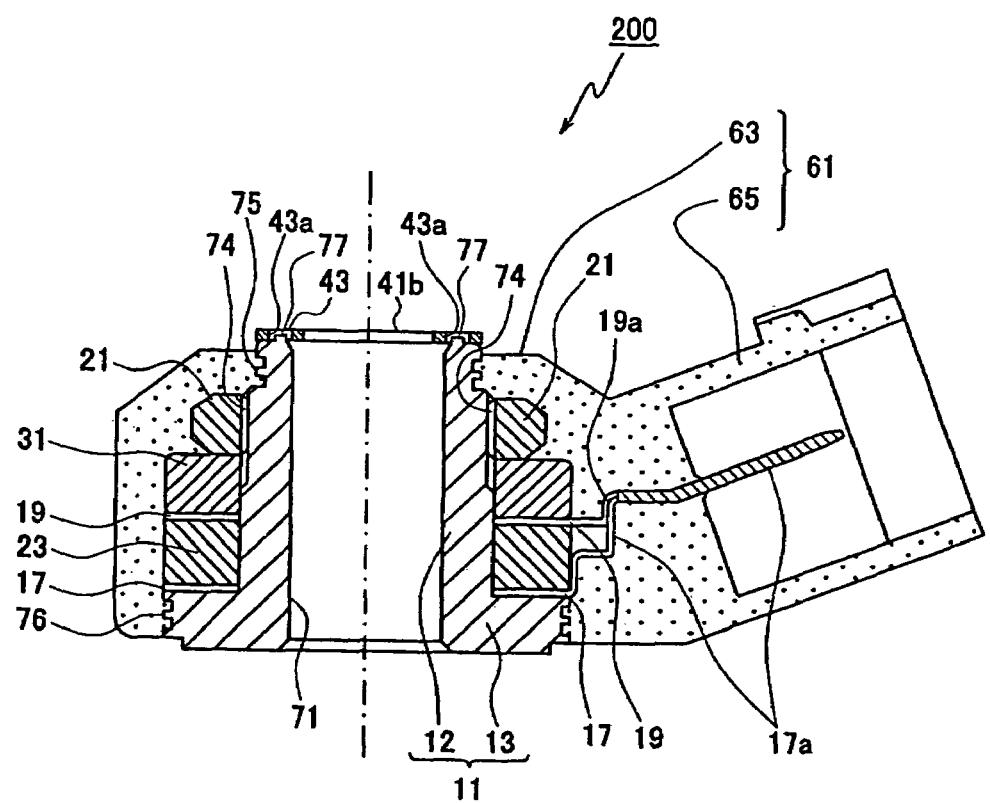
FIG. 7 is a sectional view showing an internal structure of the knock sensor 200 according to a modification of the present invention.
Figure 8A:
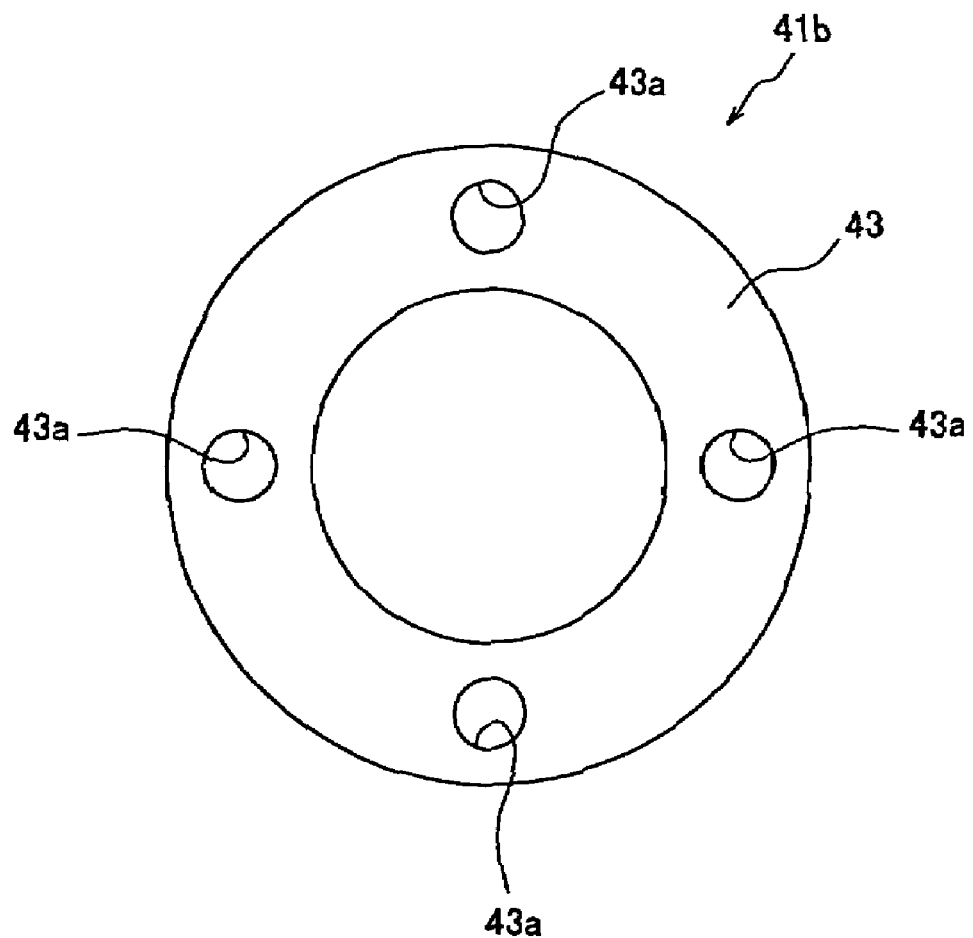
FIG. 8A is a top view of a cap 41b.

In this respect, reference is made to FIGS. 7 and 8, where an example of a cap 41b that is not fixed to the support member 11, will be described. FIG. 7 is a sectional view showing an internal structure of a knock sensor 200, illustrating another embodiment of the present invention. FIG. 8A is a top view of a cap 41b, and FIG. 8B is an elevational view of cap 41b.

The cap 41b is preferably made of the same material, as described in the above embodiment. However, the cap 41b is disposed on the top surface of the support member 11. In this regard, the cap 41b is not fixed to the support member 11.

As shown in FIG. 7, a plurality of protruding portions 77 are formed on the top surface of the support member 11.

Figure 8B:
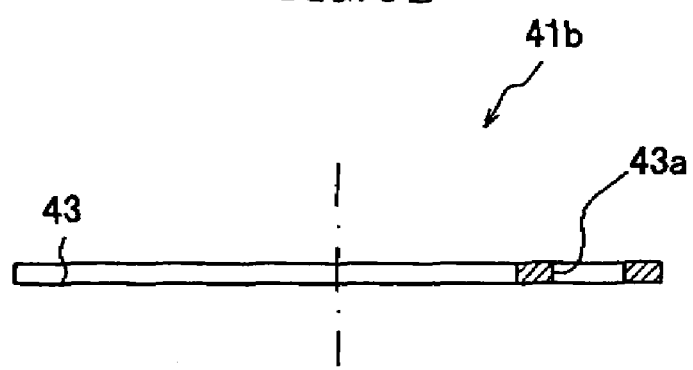
FIG. 8B is an elevational view of a cap 41b according to a modification of the present invention.

Also, as shown in FIG. 8B, the cap 41b only has a flange-like portion 43, without the cylindrical portion 45 that forms part of cap 41a. That is, the cap 41b assumes a form of a disk having a central hole where the mounting bolt 91 extends therethrough. A plurality of holes 43a is formed in the flange portion 43 to receive the protruding portions 77 of the support member 11.

These holes 43a are disposed evenly at four locations along the direction of a circumference of the flange portion 43. The protruding portions 77 formed in the support member 11 are also disposed evenly at four locations along the direction of a circumference of the top surface of the support member 11 to be in registry with holes 43a. Thus, each protruding portion 77 formed in the support member 11 may engage with each hole 43a formed in the cap 41b, respectively.

Moreover, the extent of the projection in each protruding portion 77 formed in the support member 11 is preferably lower than the thickness of the cap 41b. The reason for this is to prevent the mounting bolt 91 from directly making contact with each protruding portion 77.

Accordingly, when a knock sensor 200 is mounted on an internal combustion engine using the mounting bolt 91 shown in FIG. 5, the cap 41b is disposed on the top surface of the support member 11 so that each hole 43a thereof may engage with each protruding portion 77 of the support member 11, as shown in FIG. 7.

The force acting to rotate along the direction of a circumference of the cap 41b will be applied to the cap 41b when the mounting bolt 91 slides on the cap 41b. Since each hole 43a of the cap 41b engages with the protruding portion 77 of the support member 11, the cap 41b is securely held by the support member 11, and is prevented from moving relative to the support member 11.

In other words, the cap 41b is prevented from sliding, i.e., rotating, on the top surface of the support member 11 because each hole 43a of the cap 41b engages with the protruding portion 77 of the support member 11.

Therefore, in the embodiment shown wherein a support member 11 having protruding portions 77 and the above-described cap 41b mounted thereon, the top surface of the support member 11 is protected from being ground or abraded. Moreover, since the cap 41b assumes the shape of a plate, the process of forming the cap 41b becomes simplified.

In another embodiment, a support member 11 having the protruding portion 77, as heretofore described, may be used with a cap 41a having a cylindrical portion 45 and a flange portion 43 having holes 43a formed therein.

In the knock sensor 200 heretofore described, a plurality of protruding portions 77 are formed in the top surface of the support member 11 to engage with a plurality of holes 43a formed in the cap 41b to prevent the cap 41b from sliding on the top surface of the support member 11. However, in order to avoid the cap 41b sliding on the support member 11, it is also contemplated that one or both surfaces of the support member and the cap that make contact with each other may be roughened. By roughening the surfaces of the support member and the cap that make contact with each other, the friction generated between the support member and the cap becomes larger than the friction generated between the cap and the mounting bolt 91 when the force from the mounting bolt 91, which acts to rotate the cap, is applied. Therefore, the cap will not rotate against the support member thereby preventing the cap from sliding on the support member.

The invention claimed is:

1. A knock sensor for attachment to a surface of an internal combustion engine, said sensor comprising:
   a tubular support member having a top surface and a bottom surface, and having a hole extending therethrough from said top surface to said bottom surface, said bottom surface dimensioned to make contact with the surface of said internal combustion engine;
   a piezoelectric element held by the support member;
   a covering member mounted to the support member and covering at least a portion of the top surface of the support member, said covering member having a hole therethrough in registry with the hole in said support member when said cover member is attached to said support member, the covering member including a plurality of holes formed in a portion thereof that covers the top surface of the support member, and the support member including a plurality of projecting portions formed in the top surface thereof, said projection portions being dimensioned to engage and be received in the holes of the covering member; and
   a fixing member extending though the hole in said cover member and the hole in said support member, said fixing member tightening the knock sensor from the top surface of the support member, while the bottom surface of the support member makes contact with an internal combustion engine, wherein the covering member prevents the fixing member from directly making contact with the top surface of the support member when the fixing member tightens the knock sensor to said internal combustion engine.

2. A knock sensor as claimed in claim 1, wherein the covering member is fixedly mounted to the support member.

3. A knock sensor as claimed in claim 1, wherein the covering member covers an entire top surface of the support member.

4. A knock sensor for attachment to a surface of an internal combustion engine, said sensor comprising:
   a support member having a hole extending therethrough, said support member having a top surface and a bottom surface, said bottom surface dimensioned to make contact with the surface of said internal combustion engine;
   a piezoelectric element held by the support member;
   a covering member mounted to the support member and covering at least a portion of the top surface of the support member, said covering member having a hole therethrough in registry with the hole in said support member when said cover member is attached to said support member; and
   a fixing member extending through the hole in said cover member and the hole in said support member, said fixing member tightening the knock sensor from the top surface of the support member, while the bottom surface of the support member makes contact with an internal combustion engine, wherein the covering member prevents the fixing member from directly making contact with the top surface of the support member when the fixing member tightens the knock sensor to said internal combustion engine, wherein the covering member comprises:
   a cylindrical portion in the shape of a hollow post, said post dimensioned to be received in the hole in said support member; and
   a flange portion outwardly projecting from one end of the cylindrical portion, said flange dimensioned so as to cover the top surface of the support member.

5. A knock sensor for attachment to a surface of an internal combustion engine, said sensor comprising:
   a support member having a hole extending therethrough, said support member having a top surface and a bottom surface, said bottom surface dimensioned to make contact with the surface of said internal combustion engine;
   a piezo electric element held by the support member;
   a covering member mounted to the support member and covering at least a portion of the top surface of the support member, said covering member having a hole therethrough in registry with the hole in said support member when said cover member is attached to said support member; and
   a fixing member extending through the hole in said cover member and the hole in said support member said fixing member tightening the knock sensor from the top surface of the support member, while the bottom surface of the support member makes contact with an internal combustion engine, wherein the covering member prevents the fixing member from directly making contact with the top surface of the support member when the fixing member tightens the knock sensor to said internal combustion engine, wherein the covering member has a larger Young's modulus than that of the support member.

6. A knock sensor as claimed in claim 5, wherein the covering member is made of metal.

7. A knock sensor as claimed in claim 6, wherein the support member is made of resin.

8. A knock sensor as claimed in claim 5, wherein the covering member includes a plurality of holes formed in a portion thereof that covers the top surface of the support member; and wherein the support member includes a plurality of projecting portions formed in the top surface thereof said projecting portions being dimensioned to engage and be received in the holes of the covering member.

9. A knock sensor as claimed in claim 5, wherein the covering member is fixedly mounted to the support member.

10. A knock sensor as claimed in claim 5, wherein the covering member covers an entire top surface of the support member.

11. A knock sensor as claimed in claim 5, wherein the covering member comprises:

a cylindrical portion in the shape of a hollow post, said post dimensioned to be received in the hole in said support member; and a flange portion outwardly projecting from one end of the cylindrical portion, said flange dimensioned so as to cover the top surface of the support member.

* * * * *